United States Patent [19]

Beall et al.

[11] 4,416,517
[45] Nov. 22, 1983

[54] ELECTROCHROMIC DEVICES INCLUDING A MICA LAYER ELECTROLYTE

[75] Inventors: George H. Beall, Big Flats; Francis P. Fehlner, Corning, both of N.Y.

[73] Assignee: Corning Glass Works, Corning, N.Y.

[21] Appl. No.: 350,122

[22] Filed: Feb. 18, 1982

Related U.S. Application Data

[63] Continuation-in-part of Ser. No. 218,937, Dec. 22, 1980, abandoned.

[51] Int. Cl.³ .............................................. G02F 1/17
[52] U.S. Cl. ................................................. 350/357
[58] Field of Search ..................................... 350/357

[56] References Cited

U.S. PATENT DOCUMENTS 4,066,336  1/1978  Zeller .................................. 350/357
4,106,862  8/1978  Bayard ................................ 350/357

*Primary Examiner*—James W. Davie
*Attorney, Agent, or Firm*—K. van der Sterre

[57] ABSTRACT

Electrochromic devices comprising anodic and/or cathodic electrochromic elements in combination with an ion-permeable polycrystalline mica electrolyte, the electrolyte comprising mica crystals containing exchangeable $Na^+$, $Li^+$ and/or $H^+$ interlayer cations and optionally being provided as a self-supporting, flexible, transparent or opaque electrolyte sheet, are described.

13 Claims, 4 Drawing Figures

ELECTROCHROMIC DEVICES INCLUDING A MICA LAYER ELECTROLYTE

This application is a continuation-in-part of Ser. No. 218,937 filed Dec. 22, 1983, abandoned.

BACKGROUND OF THE INVENTION

The present invention relates to electrochromic devices, that is, devices which exhibit a reversible color change upon the application of an electric field. Specifically, the invention relates to reversible electrochromic devices incorporating cathodic and/or anodic electrochromic layers against which a polycrystalline mica layer functions as a solid electrolyte.

A number of different electrochromic materials and processes are known. One description covering various types of electrochromic devices is given by I. F. Chang in *Nonemissive Electrooptic Displays*, edited by A. R. Kmetz and F. K. von Willisen, pages 155–196, Plenum, New York (1976), reporting a 1975 Brown, Boveri Symposium on display technology.

Electrochromic materials may be categorized as cathodic or anodic depending upon whether they darken as the cathode or as the anode in an electrochemical cell. Electrochromic devices typically comprise, in addition to a selected electrochromic material, a solid or liquid electrolyte in contact with the electrochromic material which acts as a source or sink for protons or other mobile cations which must move into or out of the electrochromic material to cause darkening or fading.

The darkening of cathodic electrochromic materials is thought to involve the double injection of protons from a suitable electrolyte and electrons from a suitable electronic conductor into the materials under the influence of an applied electric field. U.S. Pat. Nos. 2,829,196 and 3,521,941 describe devices incorporating cathodic electrochromic compounds such as $MoO_3$, $WO_3$, and compounds selected from among the group of metal tungstates, molybdates, niobates, vanadates, and titanates. These patents list selected metal oxides, sulfides, fluorides, nitrides and plastics as suitable electrolytes.

Anodic materials, which are materials which darken when functioning as the anode in an electrochemical cell, are also well known. U.S. Pat. Nos. 4,191,453 and 4,258,984 disclose that hydrated iridium oxide or iridium oxyhydroxide ($IrO_x \cdot H_2O$) exhibits anodic electrochromic behavior. Other known anodic electrochromics include the hydrated oxides of rhodium, nickel, cobalt and chromium. For the purpose of the present description all such hydrated oxides will be referred to as oxyhydroxides irrespective of whether the water therein is present as hydroxyl or $H_2O$.

Electrochromic devices may be cathodic, anodic, or complementary. By a complementary device is meant a device comprising both anodic and cathodic electrochromic layers, in combination with one or more electrolyte layers, wherein both anodic and cathodic darkening of the electrochromic layers is utilized during the operation of the device. Published Japanese patent applications Nos. 56-4679 and 56-12621 disclose complementary electrochromic devices comprising an anodic electrochromic layer and a cathodic electrochromic layer separated by an electrolyte layer. In those devices darkening of the anodic and cathodic layers occurs simultaneously or sequentially when a current source is connected to the device.

The selection of a suitable electrolyte for devices such as above described remains one of the principle problems of electrochromic device design. The electrolyte should be an insulator for electron flow (electronic insulator) but a conductor for ionic flow (ionic conductor). In addition, it should allow free transfer of cations across the electrolyte-electrochromic material boundaries without interacting with the electrochromic material in a way which will degrade either material. Preferably the electrolyte may be provided as a transparent layer so that transparent devices or devices with one or more darkening layers behind the electrolyte from the viewpoint of the user can be made.

A number of different solutions to the electrolyte problem have been proposed. U.S. Pat. No. 3,712,710 suggests the use of aluminum oxide in combination with an alkali or alkaline earth metal oxide such as $Na_2O$, $K_2O$ or $MgO$ as an insulating layer material. These materials are characterized as colorless solid ionic conductors.

Fast response in $WO_3$-containing electrochromic devices has been obtained by replacing the solid charge-carrying component with a liquid or gel electrolyte, typically based on sulfuric acid. U.S. Pat. No. 3,708,220 describes gel electrolytes of this type, while U.S. Pat. No. 4,175,837 discloses liquid electrolytes containing selected sodium or lithium salts. Although such electrolytes impart good electrochromic performance, problems relating to the handling and containment of liquid and gel electrolytes remain. In addition, $WO_3$ electrochromic components are attacked by acidic electrolyte materials containing water, a process which limits the lifetime of the device.

One proposed class of solid electrolytes, disclosed in U.S. Pat. No. 3,995,943, includes certain electrically insulating silver compounds permeable to silver ions. An example of such an electrolyte is $Ag_4RbI_5$. U.S. Pat. No. 4,106,862 suggests the use of ionic conductors of the formula $Na_{1-x}Zr_2Si_xP_{3-x}O_{12}$, wherein x ranges from 0.8 to 2.4, as electrically insulating, sodium ion-conducting electrolyte materials.

It is a principal object of the present invention to provide electrochromic devices incorporating a new solid ion-permeable electrolyte material.

It is a further object of the invention to provide new electrochromic combinations of a solid electrolyte with anodic and/or cathodic electrochromic layers which can be self-supporting and/or flexible as well as transparent or opaque.

Other objects and advantages of the invention will become apparent from the following description thereof.

SUMMARY OF THE INVENTION

In accordance with the present invention, an electrochromic device incorporating a solid electrolyte layer comprising polycrystalline mica is provided. The mica layer is substituted for the liquid, gel or solid electrolyte utilized in prior art devices, being positioned adjacent one or more of the anodic or cathodic electrochromic layers and supplying or extracting mobile cationic constituents to or from the electrochromic layers under the influence of an electric field of appropriate polarity.

The essential elements of the electrochromic device of the invention are at least one solid inorganic electrochromic layer, comprising an anodic or cathodic electrochromic material, and a solid electrolyte layer in contact with the electrochromic layer or layers comprising polycrystalline mica as an essential constituent. The selected mica layer has the cation mobility necessary to permit efficient electrochromic darkening of the electrochromic material as an electric potential of appropriate polarity is applied across the layers.

As is conventional, the device will additionally include electrode means for applying an electrical potential across the electrochromic and electrolyte layers. Such means will comprise electrical leads to a voltage source and may include contact electrodes where necessary to make good electrical contact with the electrochromic layers or the electrolyte of the device. Suitable contact electrodes are typically in the form of thin, preferably transparent, electrically conductive layers of metal (e.g., gold) or metal oxides (e.g., tin-doped indium oxide) to which the electrical leads may be attached.

Although electrochromic materials are frequently mixed (ionic and electronic) conductors, the electronic conductivity of cathodic electrochromics such as $WO_3$ is sufficiently low that contact electrodes are desirable to enhance device operation. The same is true where contact is to be made to the mica electrolyte. On the other hand, certain anodic electrochromics such as indium oxyhydroxide may exhibit sufficient electronic conductivity that an added contact electrode will not be required.

In operation, the devices of the invention function by cation and/or anion migration in a manner analogous to that of conventional devices. Thus when an electric potential is applied across the electrodes such that the electrolyte is biased positively with respect to the cathodic electrochromic layer or negatively with respect to the anodic electrochromic layer, colored species are generated within the electrochromic layers. When a reverse bias is applied, bleaching of the electrochromic layers occurs. Of course the device may also include an optional rigid or flexible supporting member upon which the aforementioned elements in appropriate relationship can be disposed.

The use of polycrystalline mica in the solid electrolyte of the device of the invention offers several distinct advantages. By controlling the thickness and quality of the mica layer, a transparent, translucent or opaque device can be made. The mica layer can be sufficiently durable to support the electrochromic layer or layers and any electrode elements of the device, while still retaining some flexibility, so that a flexible freestanding electrochromic device compatible with a variety of mounting techniques can be made. Also, the layered combination can be made sufficiently thin so that only low voltages are required to provide the electric fields necessary for efficient operation. The mica electrolyte is stable under atmospheric conditions over a wide temperature range, and advantageously minimizes the corrosion problems of acidic gel electrolytes previously used with electrochromic films.

DESCRIPTION OF THE DRAWINGS

The invention may be further understood by reference to the drawings, wherein.

DETAILED DESCRIPTION

Figure 1:
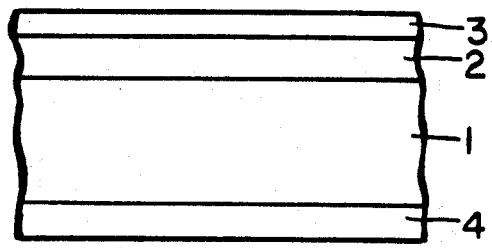
FIG. 1 is a schematic elevational view in cross-section of a free-standing electrochromic device provided in accordance with the invention.

Electrochromic devices according to the invention may be provided in a variety of configurations depending upon the intended use. Where the device is intended to be utilized in a transmission mode, i.e., operating to control the amount of light transmitted through the device to an observer or sensor, the mica electrolyte can be provided as a very thin supported transparent film (e.g., 1000 Å), as a self-supporting transparent sheet of mica paper, typically having a thickness of 2–25 microns or more, or as a film of any intermediate thickness. Electrochromic layers and electrode layers sufficiently thin to be transparent will also be employed. Transparent devices may find use, for example, in variable transmittance windows, sunroofs, eyeglasses, or the like.

Non-transparent devices intended to be used in a reflective mode, such as for electrochromic mirrors or information displays, may use tansparent, translucent or opaque mica electrolyte layers depending upon the application. An electrochromic mirror can be provided using transparent mica film or paper by incorporating a reflective metallic electrode or auxiliary layer directly in the device, or by combining a transparent device with a back-side reflective member such as a metallic or metal-coated glass or plastic support.

A selectively darkenable information display with a light-scattering background can be made using an opaque, light-scattering sheet of mica paper of substantial thickness (e.g., 1–3 mils or more) as the electrolyte layer of the device, providing the paper and/or the opposing electrochromic layer with an electrode pattern suitable for generating display characters on the viewing side. Alternatively, the device can be made transparent, but combined with a light-scattering flexible or rigid backing member or support. Thus either free-standing or supported devices, operating in either a transmission mode or in a reflection mode, can be provided using mica electrolyte layers according to the invention.

The essential characteristic of a mica layer to be incorporated as an electrolyte into an electrochromic device in accordance with the invention is that it must exhibit good ionic conductivity in an electric field. Two factors significantly affect this characteristic: the size of the mica crystals present in the mica layer and the composition of the crystals, especially the identity of the ions imparting the necessary ionic conductivity thereto.

Micas belong to the sheet-silicate group of minerals. Sheet silicates of the mica type are built of two units, a tetrahedral sheet and an octahedral sheet. The former consists of tetrahedra of Si-O linked together to form a hexagonal network such that the bases thereof are coplanar and the apices thereof point in the same direction. This configuration yields an Si:O ratio of 2:5. The octahedral sheet is generated through the impingement of two tetrahedral sheets pointing toward each other and cross-linked by the sharing of oxygens by Mg (or Al, Fe) in octahedral coordination. The two octahedral corners not falling in the plane of apical oxygens are occupied by hydroxyl or fluoride ions.

It is possible that the composite sheet formed in this manner will be electrically neutral, in which case Van der Waals-type forces bond it to the sheets immediately above and below. More commonly, however, an excess negative charge exists due to ion substitutions, unoccupied sites (vacancies), or a combination of both. Differences in properties arise both from the degree of charge deficiency and the location of the excess charge. Charge balance is restored through the uptake of cations in interlayer positions; these cations are in 12-fold coordination due to hexagonal rings of oxygens located in the sheets above and below.

The structural formula of the resulting species can be generalized as $$X^{xii}_{0-1} Y^{vi}_{2-3} Z^{iv}_{4} O_{10}(F,OH)_2$$

wherein the Roman numerals refer to ligands surrounding the cations and X, Y, and Z represent cations in the superscripted coordination, their nature being as follows:

| CATION | CATION RADIUS | ILLUSTRATIVE EXAMPLES |
|---|---|---|
| X | $\geq 0.6$ Å | Li, Na, K, Ca, Sr, Ba, Pb, NH$_4$, Rb, Cs, H (as H$_3$O$^+$) |
| Y | 0.5–0.8 Å | Mg, Al, Li, Mn, Fe, Zn, Cu, Ni, Co |
| Z | 0.3–0.6 Å | Si, Al, B, P, Ge, Be, possibly Mg |

The interlayer or X cations in the mica structure exhibit the highest mobility, being extractable for example, by ion exchange techniques and being responsible for ionic conductivity in cases where such is observed. Micas wherein the interlayer cation X is exchangeable Li$^+$, Na$^+$, or H$^+$ have been found to exhibit sufficient ionic conductivity to be used as a mica electrolyte in an electrochromic device.

For the purpose of the present description and claims, reference to the exchangeable cation H$^+$ means either H$^+$ or H$_3$O$^+$, the exact identity of this exchangeable ion not being known. Hydrogen in mica crystals may be present as interlayer hydronium (H$_3$O$^+$) ions, from which H$^+$ ions (protons) are readily mobile and exchangeable, or in association with hydration shells (H$_2$O molecular rings) which surround hydratable interlayer cations such as Na$^+$ or Li$^+$ and are thought to impart mobility thereto. In the case of hydration shells, H$^+$ conductivity can be somewhat similar to that observed for example, in ice crystals.

Particle size is also an important factor governing ionic conductivity in mica layers. Many of the known techniques for forming mica film produce a film microstructure wherein the mica platelets are substantially aligned with the plane of the film. If, as is suspected, migrating cations can move in a direction transverse to the film plane only at platelet boundaries, because the electric field is perpendicular to the plane of the platelets, then ionic conductivity will be favored by small platelet size. Thus mica layers utilized as electrolytes in accordance with the present invention will typically incorporate mica crystals not exceeding about 20 microns in their maximum dimension.

In theory, mica layers exhibiting good ionic conductivity could be prepared by any of the conventional paper or film-making techniques using any of the naturally occurring or artifical micas incorporating the necessary exchangeable cations, provided of course sufficiently small platelet dimensions could be achieved. In practice, however, best results are obtained utilizing a recently discovered film-making method wherein mica crystals are extracted from a mica-containing semicrystalline starting material, typically a non-porous fluormica glass-ceramic starting material, by contacting the material with a polar liquid to cause disintegration and the formation of a gel containing very small, uniformly sized mica crystals. This gel is then processed to provide mica film or paper exhibiting the desired properties.

Examples of glass-ceramic starting materials suitable for making gelled mica suspensions of particular utility in the preparation of a mica electrolyte are highly crystalline glass-ceramics containing a lithium and/or sodium water-swelling mica selected from the group of fluorhectorite [XMg$_2$LiSi$_4$O$_{10}$F$_2$], hydroxyl hectorite [XMg$_2$LiSi$_4$O$_{10}$(OH)$_2$], boron fluorphlogopite [XMg$_3$BSi$_3$O$_{10}$F$_2$], hydroxyl boron phlogopite [XMg$_3$BSi$_3$O$_{10}$(OH)$_2$], and solid solutions among those and between those and other structurally-compatible species selected from the group of talc [Mg$_3$Si$_4$O$_{10}$(OH)$_2$], fluortalc [Mg$_3$Si$_4$O$_{10}$F$_2$], polylithionite [XLi$_2$AlSi$_4$O$_{10}$(OH)$_2$], fluorpolylithionite [XLi$_2$AlSi$_4$O$_{10}$F$_2$], phlogopite [XMg$_3$AlSi$_3$O$_{10}$(OH)$_2$], and fluorphlogopite [XMg$_3$AlSi$_3$O$_{10}$F$_2$], wherein X represents the interlayer cation which is Li$^+$ and/or Na$^+$.

Fluormica-containing glass-ceramics of this description can be produced using conventional techniques such as described in U.S. Pat. Nos. 3,689,293, 3,732,087 and 3,756,838, or by the newer spontaneous glass-ceramic technology as described in U.S. Pat. Nos. 3,985,531 and 3,985,534. The hydroxyl mica analogs hydroxl hectorite, hydroxyl boron phlogopite, talc, polylithionite and phlogopite can be prepared, for example, by subjecting the analgous fluormica glass-ceramics, or glasses or glass-ceramics of similar composition but with reduced or no fluorine content, to a hydrothermal treatment in an atmosphere of at least 50% relative humidity at a temperature of about 200°–400° C. for a treatment interval of 0.5–48 hours.

As in the case of the mica crystals present in fluormica glass-ceramics, the hydroxyl mica crystals grown or produced by conversion utilizing hydrothermal treatments such as described are small and uniformly sized, exhibit good gelling characteristics, and produce high quality film or paper demonstrating good ionic conductivity. For more detailed information concerning the manufacture of mica film or paper using mica crystals extracted from micaceous glass-ceramic starting materials (hereinafter termed extracted crystals), reference may be made to U.S. Pat. No. 4,239,519 to Beall et. al., containing a complete description of the manufacture of mica paper from water-swelling fluormica glass-ceramics.

The mica electrolyte may consist entirely of mica crystals, or it may consist essentially of mica crystals but with minor additions of other constituents to modify the electrical and/or mechanical properties of the electrolyte layer. Additives may be introduced into the layer by incorporating them into the mica sol or gel. Examples of materials which can be used are binders such as methyl cellulose and inorganic additives such as borate and phosphate salts.

The method used to incorporate the mica electrolyte into the electrochromic device depends upon the device design which is selected. Where a free-standing device is desired, mica paper prepared in accordance with the teachings of the aformentioned patent is used as a substrate for the deposition of one or more electrochromic layers, and metal or metal oxide electrode layers are then applied to the outer elecrochromic or mica layers.

A device produced in this fashion could have a configuration such as illustrated in FIG. 1 of the drawing, wherein a mica electrolyte in the form of a relatively thick paper sheet 1 supports an electrochromic $WO_3$ layer 2, the combination in turn supporting electrode films 3 and 4. The latter may be composed of any suitable electrode material, examples of suitable transparent electrode materials including indium oxide ($In_2O_3$) and tin-doped indium oxide (ITO).

Where the electrochromic device is to be supported on a member such as a metal, plastic or glass support, the mica electrolyte can be incorporated into the device by direct deposition from a mica suspension, for example, by electrophoresis. The selected support, incorporating a conductive electrode layer if necessary for conductivity, is introduced as an anode into an electrophoretic cell containing a mica sol, and electrophoresis is initiated to deposit a thin mica film on the support. The support and film are then removed and dried, and a $WO_3$ electrochromic layer and covering electrode layer are sequentially applied to the support over the mica film.

Figure 2:
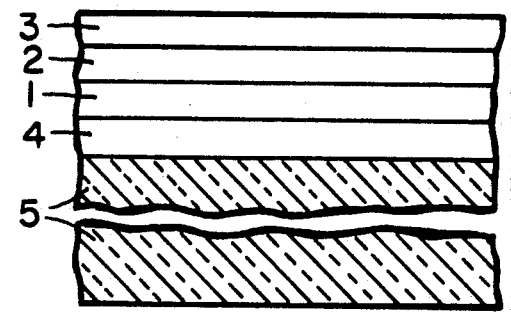
FIG. 2 is a schematic elevational view in cross-section of an electrochromic device according to the invention which is supported on glass.

An electrochromic device produced in the manner could have a configuration such as shown in FIG. 2 of the drawing, wherein mica film 1, $WO_3$ electrochromic film 2 and $In_2O_3$ electrode 3 have been sequentially deposited over electrode 4 which had previously been deposited on glass slide 5. Electrode 4 may be, for example, a transparent, electrically conductive film of antimony-doped tin oxide (ATO) applied, for example, by chemical vapor deposition.

Tungsten oxide, molybdenum oxide, and mixtures thereof are the preferred cathodic electrochromic materials for use in accordance with the invention, an example of a suitable mixture being Mo-doped $WO_3$ containing 0.1–5% $MoO_3$ and the remainder $WO_3$ by weight. However, any of the other known low temperature cathodic electrochromic oxides could equivalently be employed, examples of such oxides being those of titanium, vanadium and niobium.

Electrochromic $WO_3$ or $MoO_3$ layers or elements may be of conventional thickness and may be introduced into these electrochromic devices by any conventional method. Our preferred technique is to deposit a $WO_3$ element directly onto a mica electrolyte as a transparent film by vacuum evaporation, although sputtering is also a suitable deposition process. For evaporation, yellow tungstic oxide is heated in a tungsten evaporation boat at a pressure below about $10^{-4}$ torr to generate tungsten oxide vapors, and these are allowed to condense on the mica paper or film electrolyte until an amorphous (non-crystalline) $WO_3$ layer of suitable thickness is obtained. While thicknesses of at least 1500 Å will normally be used, thickness is not critical and can be adjusted to control the properties of the electrochromic device in the known manner.

Any of the known electrode materials can be employed in the manufacture of the electrochromic device, provided they can be applied by a process which does not disrupt previously deposited electrochromic or electrolyte layers. Examples of suitable electrode materials are electrically conducting oxides such as antimony-doped tin oxide and tin-doped indium oxide. thin metallic films composed, for example, of gold, silver, aluminum or alloys of these or other metals, carbon, or any other electrically-conducting material. A preferred electrode material for application to tungsten oxide is tin-doped indium oxide; this material is suitably applied by ion beam, magnetron, or R-F sputtering under conditions conventional for depositing oxides of this type. A representative R-F sputtering procedure is to deposit the material at a pressure of $6 \times 10^{-3}$ torr in an atmosphere of argon containing about 0.23% $O_2$, sputtering at 150 W forward power, 15 W reflected power, and a potential of 1.6 KV to provide an oxide layer of 1000 Å thickness in about 20 minutes.

Where the electrochromic device is to be utilized on a glass support, it is often convenient to apply an electrode material directly to the glass and then to apply the electrolyte and electrochromic layers thereover. Glass incorporating a conductive tin oxide coating is commercially available and can be utilized for this purpose, although the adherence of a mica film electrolyte to tin oxide coated glass has been found to be somewhat low. Of course, the electrochromic material may be deposited directly on the coated glass and a mica film positioned thereover if desired.

The invention may be further understood by reference to the following illustrative examples describing the fabrication of electrochromic devices in accordance therewith.

EXAMPLE I

A lithium fluorhectorite mica paper is prepared in accordance with the procedure described in U.S. Pat. No. 4,239,519, utilizing the glass batch ingredients sand ($SiO_2$), magnesia (MgO), magnesium fluoride ($MgF_2$), and lithium carbonate ($Li_2CO_3$) to formulate a batch for a glass having the composition of Example 14 in Table IV of that patent. The batch is compounded, ball-milled, melted without stirring in a covered platinum crucible over a five-hour interval at 1450° C., and formed into glass ribbon by rolling. The glass has an approximate composition, in parts by weight as calculated from the batch, of about 64.4 parts $SiO_2$, 10.8 parts MgO, 8.0 parts $Li_2O$ and 16.7 parts $MgF_2$.

The glass ribbon thus provided is heated to a temperature of 700° C. for 4 hours to cause thermal crystallization to a fine-grained mica glass-ceramic. The principal crystal phase identifiable by X-ray diffraction in the glass-ceramic product is lithium fluorhectorite of the structural formula $Li^{xii}(Mg_2Li)^{vi}Si_4^{iv}O_{10}F_2$, although minor quartz, amphibole and/or lithium disilicate phases are also present.

The glass-ceramic ribbon is immersed in deionized water at room temperature for 16 hours, an interval sufficient to cause complete breakdown of the material and separation into micaceous and non-micaceous phases. The mica crystals, being water-swelling, are present in the liquid phase as a gelled suspension. The non-micaceous phases and residual glass form a bottom sediment in the container. Separation of the pure mica gel phase from the sediment is accomplished by decantation, and the gel is concentrated by evaporation to a viscosity of 100 centiposes (a solids content of about 7–10%).

To form a transparent mica paper from the gel, it is boiled to promote more complete separation of the mica into single-layer crystals, and then centrifuged and decanted to separate any remaining non-micaceous phases and large mica crystals from the gel. The purified gel is then diluted to form a more fluid suspension of mica crystals, having a solids content of about 2%, and the suspension is cast onto a flat, polished surface such as glass to a depth on the order of one-eighth inch and allowed to dry at ambient temperatures for 24 hours. The product, which is self-supporting and readily peeled from the polished surface, is a transparent mica paper of approximately 25 microns thickness.

To prepare an electrochromic device using this paper, it is first dried overnight at 120° C. to reduce the possibility of delamination during subsequent coating operations. The dried paper is then placed in an evaporation chamber over an evaporation boat containing a quantity of yellow tungstic oxide, the chamber is evacuated, and the evaporation boat is heated to volatilize the oxide. Evaporation is continued at a pressure of $5 \times 10^{-5}$ Torr, and at a rate sufficient to deposit the oxide at 5 Å/sec. on the paper, until a tungsten oxide film about 3000 Å thick has been formed. Evaporation is then halted and dry nitrogen is admitted to the chamber.

Electrodes are applied to the tungsten oxide-coated paper using a sputtering procedure. The coated paper is placed in a sputtering unit with a target consisting of tin oxide-doped indium oxide, containing 9 mole % tin oxide and the remainder indium oxide. Material from the target is R-F sputtered onto the tungsten oxide film at 1.6 kv utilizing 150 W forward power and 15 W reflected power, without substrate cooling and in an argon-oxygen atmosphere containing 0.23% $O_2$ by volume at a pressure of $6 \times 10^{-3}$ Torr. Under these conditions a sputtered tin-doped indium oxide (ITO) film about 1000 Å thick is provided over the tungsten oxide film in about 20 minutes.

A sputtered ITO film is then applied to the previously uncoated side of the mica paper under the sputtering conditions above described, providing a multilayer combination having a configuration such as shown in FIG. 1 of the drawing. Wire leads are then attached to the opposing ITO contact electrodes with silver paint.

The device thus provided is tested by applying an electric potential of 5 v across the contact electrodes, the $WO_3$ layer being biased negatively with respect to the mica electrolyte. Under this condition a 55% decrease in optical transmission through the device is observed over a 1.5 minute darkening interval.

Upon disconnecting the device from the voltage source, the device remains substantially in the darkened state, although slow thermal bleaching of the device does occur with no bias applied and no shorting of the wire leads. The potential across the leads in the darkened state is about 2 volts one minute after disconnection from the voltage source.

Rapid bleaching of the device occurs when a reverse bias is applied to the leads. Biasing the $WO_3$ layer at +5 v with respect to the mica electrolyte caused a substantially complete reversal of the electrochromic darkening over a 0.5 minute bleaching interval.

Although bleaching is substantially complete when a reverse bias is applied to the electrodes of a darkened device, some residual coloration is observed which gradually increases as the number of darkening and bleaching cycles increases. This residual darkening is attributed to an interaction between the ITO electrode and the mica electrolyte, perhaps caused by lithium migration into the electrode layer, lithium being an important exchangeable interlayer cation in this mica electrolyte. However, it is found that this discoloration can be removed by heating the device for one hour at 300° C. in air.

Figure 3:
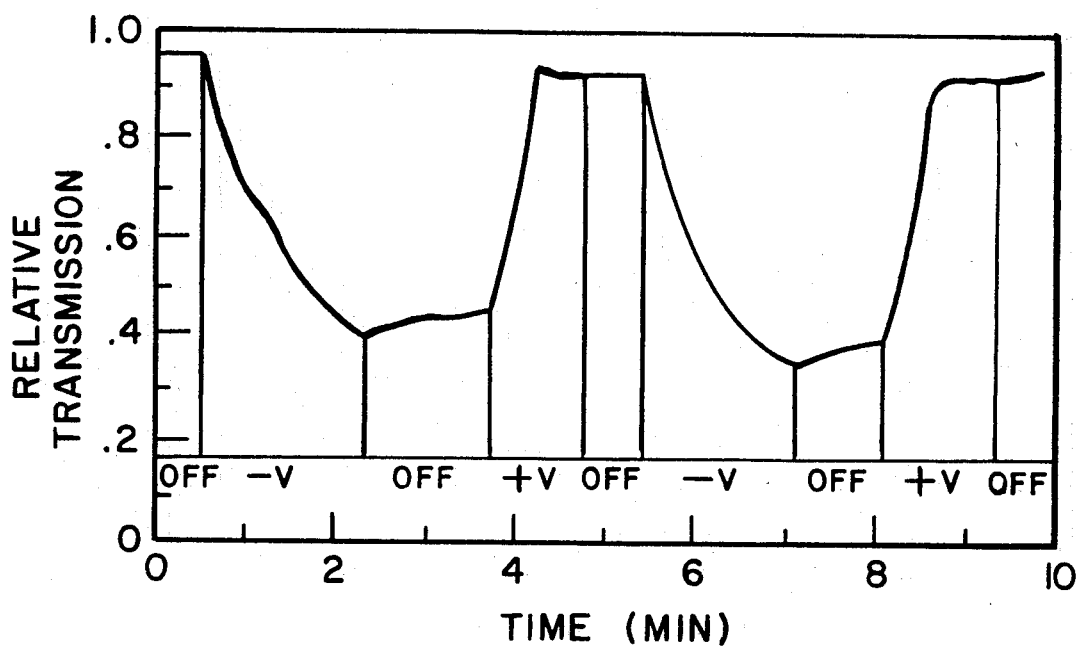
FIG. 3 diagrammatically illustrates the darkening and bleaching characteristics of a transparent electrochromic device such as shown in FIG. 1.

FIG. 3 of the drawing plots the darkening and bleaching behavior of a free-standing, transparent electrochromic device such as above described as it is cycled by the application of electrical voltages to the electrodes. The vertical axis plots the relative light transmittance of the device while the horizontal axis plots time and indicates the polarity of the applied voltage to the $WO_3$ electrode at any given time. The slow thermal bleaching of the darkened device under no-voltage conditions, as well as the rapid bleaching which occurs when the $WO_3$ electrode is positively biased, are evident.

The initial or undarkened visible transmittance of this device, assigned the relative value of 1 on the diagram of FIG. 3, averages about 6% in the visible region as measured on an absolute basis. Absolute transmittance measurements made by spectrometer on a darkened device show that much of the initial darkening is due to a major absorption peak centered at about 580 nm, with some absorption due to a minor peak at 440 nm. As darkening proceeds, broad-band absorption grows across the whole visible spectrum, but with emphasis in the red. This broad-band absorption corresponds with that previously observed in tungsten oxide electrochromic devices.

EXAMPLE II

A free-standing opaque electrochromic device is made utilizing an opaque sheet of lithium hectorite mica paper prepared in accordance with a paper making procedure analogous to that described in Example I. However, in order to provide an opaque rather than transparent paper product, the gel is not purified as in Example I, but merely diluted to 2% solids content, cast on a polished surface, and dried. The product is a flexible opaque paper having a thickness of about 2 mils.

A tungsten oxide electrochromic layer and opposing ITO electrode layers are applied to this paper utilizing the procedure described in Example I. The thicknesses of the applied $WO_3$ and ITO layers are substantially equivalent to those of the Example I device, and leads are applied to the electrodes in the same fashion.

The device thus produced is qualitatively tested for electrochromic response by applying a 5 v potential across the leads, the $WO_3$ electrode being biased negatively with respect to the mica electrode. Darkening of the tungsten oxide under the electrode to a blue color is observed within a minute after the voltage is applied, and rapid bleaching of the tungsten oxide occurs when a reverse bias of +3 v is applied to the tungsten oxide electrode. The light scattering effectiveness of the opaque mica paper electrolyte of this device makes it a preferred configuration for display applications.

EXAMPLE III

A glass slide provided with a transparent, electrically conductive, antimony-doped tin oxide surface film about 2500 Å in thickness is selected for use as a device substrate. The conductivity of the doped tin oxide film is sufficient for use as one of the electrodes of an electrochromic device.

An electrolyte layer in the form of a lithium fluorhectorite mica film is deposited onto a section of the tin oxide film by electrophoresis. This is accomplished by partially immersing the slide and film into a mica sol prepared by diluting the mica gel described in Example I. The gel is diluted to a solids content of about 0.06% by the addition of water and methanol in proportions providing a 50:50 (volume) water-methanol mixture in the final sol.

A copper plate is immersed in the mica sol spaced from the doped tin oxide film on the glass slide, this plate serving as the cathode of the cell while the doped tin oxide coating on the slide serves as the anode. A potential of 3.5 volts is applied between the cathode and anode. The deposition of mica onto the anode commences with the application of this potential and is continued until a mica film about 1000 Å in thickness has been deposited. The coated slide is then removed from the cell and heated at 120° C. for 16 hours to dry and consolidate the mica film.

The film is then covered with a $WO_3$ electrochromic layer about 2000 Å in thickness utilizing the $WO_3$ evaporation technique described in Example I. Over the $WO_3$ layer are then deposited, in a dot pattern, a series of indium oxide dots forming the tungsten-oxide-contacting electrodes of the device.

The indium oxide electrodes are deposited by a conventional ion-beam coating technique using a beam of ionized argon atoms to sputter the electrode material from an indium oxide target. Sputtering is carried out in a vacuum chamber at an oxygen pressure of $5 \times 10^{-5}$ Torr and a total $Ar+O_2$ pressure of $1.4 \times 10^{-4}$ Torr, with oxide layers 1000 Å in thickness being formed within a deposition interval of approximately 75 minutes utilizing this procedure. Ion current was maintained at 24 mA and accelerator potential at 220 V. during deposition.

The resulting device, having a configuration such as shown in FIG. 2 of the drawing, is tested by applying a potential of 3.5 v across the electrodes, positively biasing one of the indium oxide dot electrodes connected to the $WO_3$ layer with respect to the tin oxide film electrode by pressing on the dot electrode with a silver probe. Relatively rapid darkening of the $WO_3$ film under the dot electrode is observed in this configuration, while rapid bleaching of the $WO_3$ can be achieved by reversing the polarity of the electrodes.

The major difficulty with the electrochromic device configuration of Example III is that of securing adherence between the mica electrolyte layer and the doped tin oxide film electrode. The mica film tends to separate from the tin oxide electrode and the separated areas then do not darken upon the application of a potential to the device. On the other hand, the substitution of the doped tin oxide electrode in this configuration (e.g., FIG. 2, reference 4) for the pure or doped indium oxide electrode of the Example I configuration (e.g., FIG. 1, reference IV) avoids the darkening of the electrode encountered in the latter case.

Anodic electrochromic devices provided in accordance with the invention can have configurations such as reported above for the cathodic devices. However, darkening of the anodic devices is achieved by biasing the electrochromic material positively with respect to the mica electrolyte. If desired, the contact electrode adjacent the anodic electrochromic material may be omitted, particularly in the case of the preferred iridium oxyhydroxide material which has excellent electronic conductivity.

The preferred electrochromic devices of the invention are those referred to herein as complementary electrochromic devices. These comprise a cathodic electrochromic layer, an anodic electrochromic layer, and a solid electrolyte layer, positioned between the cathodic and anodic electrochromic layers, which is effective in preventing spontaneous bleaching of current-induced electrochromic darkening while the device is in an open-circuit state.

The cathodic electrochromic layer is typically composed of at least one oxide selected from the group consisting of $WO_3$ and $MoO_3$, including mixtures thereof. Other cathodic electrochromic oxides can be used but these oxides, particularly $WO_3$ alone or in combination with a minor addition of $MoO_3$, appear to provide the best electrochromic darkening response.

The anodic electrochromic layer, which is positioned adjacent the electrolyte layer but on the opposite side thereof from the cathodic electrochromic material, is typically composed of an oxyhydroxide of iridium, chromium, manganese or iron. These anodic materials operate in useful complementary fashion with respect to the specified cathodic materials, darkening and bleaching concurrently or sequentially at electrical potentials which do not promote undersirable side reactions or degradation in the other materials used in the device. Again iridium oxyhydroxide is the preferred anodic material.

A variety of techniques may be used to fabricate complementary electrochromic devices provided in accordance with the invention. In the preferred method, the mica electrolyte in the form of a thin self-supporting sheet or film is used as a deposition substrate upon which the cathodic and anodic electrochromic layers are deposited by evaporation, sputtering, or any other suitable deposition technique. Contact electrodes, if needed, are then applied over the deposited electrochromic layers to provide an operative device.

Figure 4:
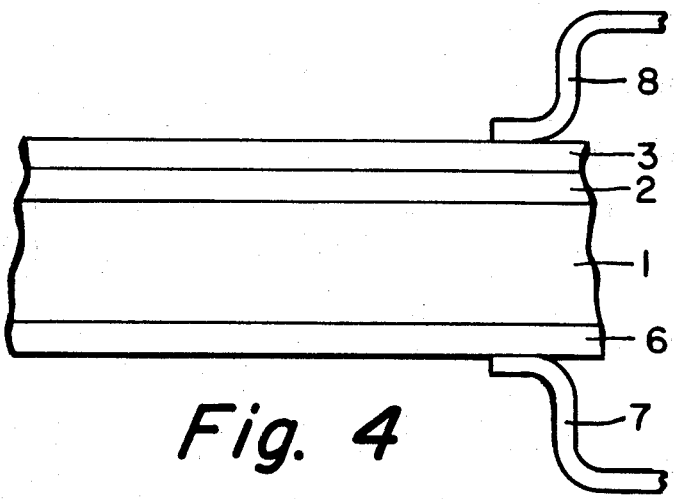
FIG. 4 is a schematic elevational view in cross-section of a free-standing complementary electrochromic device provided in accordance with the invention.

An example of a device made in this way is schematically illustrated in FIG. 4 of the DRAWING. Adjacent to self-supporting mica film 1 are positioned cathodic $WO_3$ electrochromic layer 2 and anodic $IrO_x.H_2O$ layer 6. Electrical contact to the anodic $IrO_x.H_2O$ layer is by means of electrical conductor 7, whereas contact with the cathodic $WO_3$ layer is made by means of contact electrode 3 and conductor 9.

A second method of fabrication, suitable for use where the application demands a relatively rigid supporting member, involves depositing all of the layers of the device on a selected support. A rigid or flexible glass or plastic sheet is first provided with a contact electrode or conductor by a suitable deposition or bonding process, and thereafter one of the electrochromic layers, the mica electrolyte layer, and the other electrochromic layer are sequentially applied to the support over the first-deposited electrode.

For complementary devices wherein near-simultaneous darkening of the anodic and cathodic materials is to be used to enhance the range of optical transmission for the device, it is important that the mica electrolyte exhibit good transparency. Electrophoresis from suspensions of extracted mica crystals such as hereinabove described constitutes the preferred method for forming mica films or layers for these applications because it effects a purification of the starting material by virtue of the selective deposition of the mica crystals on the attracting electrode of the electrophoretic cell. Also, electrophoresis automatically promotes an exchange of $Na^+$ or $Li^+$ from the mica for $H^+$ or $H_3O^+$ from a water-based sol, which is typically present at high concentrations near the anode where the mica crystals are typically deposited. Film or paper produced by such a method therefore contains exchangeable H+ and is transparent as made, thus constituting a superior electrolyte for use in a transparent or translucent complementary device of the type herein disclosed.

A satisfactory method for producing self-supporting mica film or paper by a continuous electrophoresis process is described in the copending, commonly assigned application of F. P. Fehlner et al., Ser. No. 350,289, filed concurrently herewith, and that application is expressly incorporated by reference herein for a more complete description of the method and apparatus suitable for its use. Of course, where film deposition is to take place on a supporting member for the device, electrophoresis may still be employed by depositing the mica from a suspension of mica crystals directly on the previously-coated support.

Particularly in the case of complementary electrochromic devices, it is desirable to deposit the layers of the structure in order of decreasing deposition temperature to avoid modifying the properties of previously deposited layers. For example, magnetron reactive sputtering of iridium is a suitable technique for depositing porous iridium oxide films but is preferably used early in a deposition sequence because it frequently involves somewhat elevated substrate temperatures. These porous $IrO_x \cdot H_2O$ films have been found to give the best electrochromic performance, and subsequent heating thereof should be limited in order to minimize the density and maximize the porosity of the deposited oxide layer.

Vacuum evaporation is a suitable method for applying materials such as $WO_3$ to a substrate or previously deposited layer, and this can normally be accomplished at lower substrate temperatures than observed in sputtering processes. Finally, ion beam sputtering can be used late in the deposition sequence because it involves very little heating of the deposition substrate. Hence, this technique is suitable for use, for example, to deposit contact electrode layers in cases where such are required.

In some cases it may be desirable to add additional film layers to a device to reduce environmental effects on device performance or to modify the light transmitting properties thereof. For example, antireflective layers composed of $SiO_2$ or the like are useful to reduce the high reflectivity of contact electrode materials such as ITO.

The following example describes the fabrication of a complementary electrochromic device in accordance with the invention.

EXAMPLE IV

A mica film for use as an electrolyte in an electrochromic device is prepared as follows. A quantity of glass-ceramic ribbon comprising a mica crystal phase and having the composition of the glass-ceramic ribbon described in Example I is provided. However, the batch materials used are pure LiF, MgO, $MgF_2$ and sand in order to minimize the amount of iron and other impurities in the mica product. This glass-ceramic ribbon, which contains a principal crystal phase identified by X-ray diffraction as lithium fluorhectorite wherein the crystalline mica platelets do not exceed about 20 microns in their largest dimension, is placed in distilled water for about 24 hours. Such exposure to water causes the complete breakdown of the glass-ceramic ribbon, providing a suspension of the mica crystals in the aqueous phase and a sediment comprising any non-mica crystal phases and residual glass.

The aqueous mica suspension, containing about 10% mica crystals by weight, is separated from the sediment by centrifuging and decantation, and is then diluted, first with water and then with methanol, to provide a mica sol containing 1 weight percent of suspended mica crystals in a liquid phase consisting of about 50% $H_2O$ and 50% $CH_3OH$ by volume. This sol is poured into a stainless steel fluid reservoir for subsequent deposition by electrophoresis as hereinafter described.

The stainless steel reservoir is a component of an apparatus for the continuous deposition of mica film by electrophoresis. The apparatus comprises, in addition to the reservoir, a rotating anode wheel partially immersed in the reservoir which consists of a glass cylinder supporting an electrically conductive, antimony-doped tin oxide coating. The stainless steel reservoir surface is the electrophoresis cathode, being connected to the negative terminal of a DC power supply, while the anode wheel is connected to the positive terminal.

Operating this apparatus at 5–8 V for a constant 15 ma current through the described mica sol, with 12.5 $cm^2$ of the rotating anode immersed in the sol at any particular time and with the anode surface traversing the sol at a rate of about 48 $cm^2$ per hour, a transparent mica film about 3 microns in thickness and 2.5 cm in width is continuously transported out of the reservoir on the rotating anode. This film is dried with a heat lamp as it emerges from the sol and is thereafter removed from the anode wheel by means of a spring metal scraper. Because the film has been deposited by electrophoresis, it is depleted with respect to Li+ and contains H+ as the principal exchangeable cation.

As above noted, the foregoing method and apparatus comprise no part of the present invention, being described and claimed in the copending, commonly assigned patent application of F. P. Fehlner et al., expressly incorporated herein by reference, which may be referred to for a further description of the method and apparatus above described. However, it will be understood that alternative methods for providing transparent mica film may be utilized without departing from the scope of the present invention.

The transparent mica film thus provided is used as a deposition substrate for the fabrication of a transparent complementary electrochromic device. An iridium oxide anodic electrochromic layer is first deposited on this film by a reactive sputtering process. Deposition is carried out in a vacuum chamber from a pure iridium target in pure oxygen at 3 microns pressure. The sputtering process is carried out at 350 V and 0.1 A, providing a film about 300 angstroms thick in a deposition interval of about 3 minutes. The film has a density of about 10 $g/cm^3$ following rapid hydration upon exposure to room air.

A tungsten oxide film is deposited on the side of the mica film opposite the anodic layer utilizing a vacuum evaporation process. Evaporation is carried out in a vacuum chamber at a pressure of about $5 \times 10^{-5}$ Torr, evaporating pure $WO_3$ from a resistively heated evaporation boat operated at a temperature providing $WO_3$ deposition on the mica film at a rate in the range of about 5 Å/sec. The evaporation process is continued until a $WO_3$ film about 3000 Å in thickness is deposited.

Following deposition of the cathodic $WO_3$ layer, a tin-doped indium oxide (ITO) electrode is deposited over the tungsten oxide to provide electrical contact therewith. Deposition of the ITO is by ion-beam sputtering. Deposition is carried out in a vacuum chamber at partial pressures of $7\times10^{-5}$ Torr $O_2$ and $1.4\times10^{-4}$ Torr total of $Ar+O_2$. A ceramic target consisting of 90 mole percent $In_2O_3$ and 10 mole percent $SnO_2$ is used as the ITO source under sputtering conditions of 25 mA beam current and 220 V accelerating potential, providing ITO deposition on the $WO_3$ layer at a rate of about 10–20 Å/min.

The electrochromic device thus provided, although self-supporting, is conveniently positioned between glass slides for the purpose of testing. Contact with the ITO electrode and with the iridium oxide electrochromic layer is achieved by means of evaporated chrome-gold coatings on the glass slides, silver paint being used to attach the chrome-gold coatings to the surfaces of the ITO electrode and the iridium oxide electrochromic layer.

After equilibration of the device at 75% relative humidity for one hour, the device is tested for electrochromic response. At an applied voltage of 1.2 V across the cathodic $WO_3$ and anodic $IrO_x.H_2O$ layers, a decrease in transmittance from an initial value of about 42% to a darkened value of about 22% is observed in a darkening interval of about 90 seconds.

Reversing the electric field, bleaching of the device to approximately the original transmittance value of 42% occurs within a 30-second interval. The bleached transmittance of the device in the open circuit condition is relatively stable.

Upon the application of 2.2 V across the device, the transmittance is observed to drop from the 42% value to about 11% in less than 60 seconds, the induced voltage in the fully darkened state at this applied voltage being about 1.9 V. Shorting the leads of the device in this darkened state causes fading to a transmittance value of about 25%, with the faded transmittance being fairly stable in an open circuit condition. Reversing the field, the transmittance of the device increases to about 48% within about 45 seconds after the reverse voltage is applied. Darkening and bleaching of the device under normal and reversed applied voltages of 2.2 V may be repeated several times without altering the darkened or bleached transmittance of the device.

The foregoing example illustrates the effectiveness of the complementary device structure in reducing the voltage required for device operation over a large transmittance range. Hence, whereas this device exhibits a transmittance change in excess of 20 percentage points at applied voltages of ±2.2 volts, a device such as described in Example I exhibits a transmittance change on the order of 4 percentage points at ±5 volts applied.

As with prior art electrochromic devices wherein proton movement is postulated as an important mechanism for electrochromic response, moisture is believed to play an important role in efficient electrochromic darkening and bleaching in the mica-containing devices of the invention. Devices which have been thoroughly dried before testing can in fact exhibit reduced or no darkening upon the application of normally useful electrical potentials, whereas devices equilibrated in a high-relative-humidity environment exhibit excellent electrochromic response. This fact is of course well known in the art and forms no part of the present invention.

We claim:

1. A electrochromic device comprising at least one solid inorganic electrochromic layer, a solid electrolyte layer in contact with the electrochromic layer which is permeable to cations but substantially impermeable to electrons, and electrode means for applying an electrical potential across the electrolyte and electrochromic layers, characterized in that the solid electrolyte layer comprises polycrystalline mica, the mica crystals in the layer not exceeding about 20 microns in their largest dimension and containing at least one species of exchangeable interlayer cation selected from the group consisting of $Na^+$, $Li^+$ and $H^+$.

2. An electrochromic device in accordance with claim 1 wherein the electrolyte layer consists essentially of polycrystalline mica.

3. An electrochromic device in accordance with claim 2 wherein the mica crystals are selected from the group consisting of fluorhectorite, hydroxyl hectorite, boron fluorphlogopite, hydroxyl boron phlogopite, and solid solutions among these and between these and other structurally compatible species selected from the group consisting of talc, fluortalc, polylithionite, fluorpolylithionite, phlogopite and fluorphlogopite.

4. An electrochromic device in accordance with claim 2 wherein the mica crystals are fluorhectorite crystals.

5. An electrochromic device in accordance with claim 2 wherein the mica crystals contain $H^+$ as an exchangeable interlayer cation.

6. An electrochromic device in accordance with claim 2 wherein the electrolyte layer consists of a self-supporting sheet.

7. An electrochromic device in accordance with claim 2 wherein the mica layer is transparent.

8. An electrochromic device in accordance with claim 2 wherein the mica layer is opaque.

9. An electrochromic device in accordance with claim 1 which comprises at least one cathodic electrochromic layer containing at least one oxide selected from the group consisting of $WO_3$ and $MoO_3$.

10. An electrochromic device in accordance with claim 8 wherein the cathode electrochromic layer consists essentially of 0.1–5% $MoO_3$ and the remainder $WO_3$ by weight.

11. An electrochromic device in accordance with claim 1 which comprises at least one anodic electrochromic layer containing an oxyhydroxide of iridium.

12. An electrochromic device in accordance with claim 2 which comprises at least two electrochromic layers, including a cathodic electrochromic layer in contact with a first surface of the polycrystalline mica electrolyte layer and an anodic electrochromic layer in contact with a second surface of the polycrystalline mica electrolyte layer.

13. An electrochromic device in accordance with claim 12 wherein the cathodic electrochromic layer consists essentially of $MoO_3$ and/or $WO_3$, and wherein the anodic electrochromic layer consists essentially of iridium oxyhydroxide.

* * * * *